(12) United States Patent
Yun

(10) Patent No.: US 7,738,780 B2
(45) Date of Patent: Jun. 15, 2010

(54) METHOD AND APPARATUS FOR CONTROLLING A RECORDING OPERATION OF A DIGITAL VIDEO DEVICE

(75) Inventor: Yeo Han Yun, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 1095 days.

(21) Appl. No.: 11/033,129

(22) Filed: Jan. 12, 2005

(65) Prior Publication Data

US 2006/0056797 A1    Mar. 16, 2006

(30) Foreign Application Priority Data

Sep. 13, 2004   (KR) .................. 10-2004-0073115

(51) Int. Cl.
| | |
|---|---|
| H04N 5/00 | (2006.01) |
| H04N 5/93 | (2006.01) |
| H04N 5/91 | (2006.01) |
| H04N 7/00 | (2006.01) |

(52) U.S. Cl. .................. 386/125; 386/55; 386/68; 386/95; 386/126

(58) Field of Classification Search .............. 386/95, 386/125–126, 55, 68
See application file for complete search history.

(56) References Cited

U.S. PATENT DOCUMENTS

| | | | | |
|---|---|---|---|---|
| 6,889,383 | B1 * | 5/2005 | Jarman ...................... | 725/28 |
| 7,519,267 | B2 * | 4/2009 | Yoo et al. ................... | 386/68 |
| 2002/0126983 | A1 * | 9/2002 | Sato et al. ................... | 386/46 |
| 2002/0146239 | A1 * | 10/2002 | Hamasaka et al. ............ | 386/95 |
| 2004/0226035 | A1 * | 11/2004 | Hauser, Jr. .................. | 725/9 |
| 2007/0172208 | A1 * | 7/2007 | Okada et al. ................ | 386/95 |

* cited by examiner

*Primary Examiner*—Thai Tran
*Assistant Examiner*—Daquan Zhao
(74) *Attorney, Agent, or Firm*—Ked & Associates LLP

(57) ABSTRACT

A method and apparatus for controlling a recording operation of a digital video device is provided which automatically skip over or mute a data stream of some duration consistent with a user-defined filter condition during a data recording process, such as a disc copy process. The method and apparatus prevent data of the duration from being recorded, or additionally record navigation information, such as playlist information, to prevent some duration from being reproduced even if the duration has been recorded in a recording process. Thus, the method and apparatus prevent video and audio data of some duration inappropriate for adolescents or children from being freely copied/recorded, or from being reproduced by a general playback operation.

7 Claims, 10 Drawing Sheets

Filter Table ( ex : Title Name = "Super Girl" )

| Event | Start | End | Duration | Type | Filter Condition |
|---|---|---|---|---|---|
| 1 | 00:04:15:19 | 00:04:48:26 | 997 | Skip | Violence & Sex |
| 2 | 00:04:51:26 | 00:04:58:26 | 210 | Skip | Violence & Dead |
| 3 | 00:06:15:20 | 00:06:48:25 | 995 | Mute | Gruesome |
| ⋮ | ⋮ | ⋮ | ⋮ | ⋮ | ⋮ |

*Filter Table ( ex : Title Name = "Super Girl" )*

| Event | Start | End | Duration | Type | Filter Condition |
|---|---|---|---|---|---|
| 1 | 00:04:15:19 | 00:04:48:26 | 997 | Skip | Violence & Sex |
| 2 | 00:04:51:26 | 00:04:58:26 | 210 | Skip | Violence & Dead |
| 3 | 00:06:15:20 | 00:06:48:25 | 995 | Mute | Gruesome |
| ⋮ | ⋮ | ⋮ | ⋮ | ⋮ | ⋮ |

00:04:15:19
Start_Timecode

00:04:48:26
End_Timecode

Skip
997

METHOD AND APPARATUS FOR CONTROLLING A RECORDING OPERATION OF A DIGITAL VIDEO DEVICE

BACKGROUND OF THE INVENTION

1. Field of the Invention

The invention relates to a method and apparatus for controlling a recording operation of a digital video device.

2. Background of the Related Art

In recent times, there have been widely used digital video devices capable of recording/storing large amounts of high-quality video data and high-quality audio data for a long period of time, for example, optical disc devices, such as a DVD-player and a DVD-recorder, and a Hard Disc Drive (HDD)—recorder, etc.

One of the aforementioned digital video devices, for example, a DVD player, includes an optical disc 10, an optical pickup unit 11, a VDP (Video Disc Play) system 12, a microcomputer 13, an OSD (On Screen Display) generator 14, and a memory 15, as shown in FIG. 1. For example, a non-volatile memory such as a flash memory may be adapted as the memory 15.

The memory 15 downloads and stores filter table information needed to perform a specific function, such as a clearplay function. A clearplay function is a new playback function, which has recently been proposed and widely used. It is expected that the clearplay function will be widely applied to DVD players and a variety of other digital video devices.

As shown in FIG. 2, the filter table stored in the memory 15 associates a unique title name or a tide ID with a plurality of events. Each event is comprised of start-, end-, duration-, type-, and filter condition information.

For example, a first event (Event #1) associated with a title name "Super Girl" records start information "00:04:15:19", end information "00:04:48:26", duration information "997", type information "Skip", and filter condition information "Violence & Sex" therein. A second event (Event #2) records start information "00:04:51:26", end information "00:04:58:26", duration information "210", type information "Skip", and filter condition information "Violence & Death" therein.

If the optical disc 10 is seated in the digital video device, the microcomputer 13 checks a title name or a title ID by referring to navigation information of the optical disc 10. For example, if the title name (for example, Super Girl) of the optical disc 10 is equal to another title name (for example, Super Girl) managed by a filter table contained in the memory 15, the microcomputer 13 carries out a series of clearplay functions by referring to corresponding event information. For example, the clearplay function automatically skips over duration of data corresponding to a user-defined filter condition, such as "Violence" or "Sex", or mutes a playback audio signal.

If time code (Timecode) information counted during a data playback operation is equal to start information "00:04:15:19" (hr:mm:sec:frame) of the first event (Event #1) on the condition that the user determines a condition of "Violence & Sex" to be a filter condition as shown in FIG. 2, the microcomputer 13 controls operations of the VDP system 12, such that it suspends the playback operation and automatically carries out a skip operation.

Thereafter, when time code information equal to end information of the first event (Event #1) "00:04:48:26" (hr:mm:sec:frame) is counted or a skip function for skipping over the duration of the "997" frame is completed, the microcomputer 13 re-performs the playback operation from a corresponding position.

The microcomputer 13 automatically skips over or mutes some duration of title information equal to the user-defined filter condition (for example, Violence, Sex) by referring to information recorded in the filter table, such that it prevents video and audio data of some duration, in which unhealthy video and audio data inappropriate for adolescents or children is stored, from being freely exposed to the adolescents or children.

However, since the aforementioned clearplay function is carried out only in a playback mode, it is unable to prevent some duration of a title consistent with a user-defined filter condition from being recorded in a data recording process, such as a disc copy process. Also, a digital video device unequipped with the clearplay function has the disadvantage that video and audio data of some duration inappropriate for adolescents or children is unavoidably reproduced without any restriction.

SUMMARY OF THE INVENTION

An object of the invention is to solve at least the above problems and/or disadvantages and to provide at least the advantages described hereinafter.

In order to achieve at least the above objects, in whole or in part, and in accordance with the purposes of the invention, as embodied and broadly described herein, there is provided a method for controlling a recording operation of a digital video device in accordance with an embodiment of the invention that includes detecting duration of a portion of a data stream, reproduction of which is to be restricted by a restriction operation, from a sequentially-received data stream, and selectively recording a remaining portion of the data stream other than the detected duration.

To further to achieve at least the above objects, in whole or in part, and in accordance with the purposes of the invention, as embodied and broadly described herein, there is provided a method for controlling a recording operation of a digital video device in accordance with an embodiment of the invention that includes detecting duration of a portion of a data stream, reproduction of which is to be restricted by a restriction operation, from a sequentially-received data stream while recording the sequentially-received data stream, and generating and recording navigation information for selectively reproducing the remaining duration of the data stream other than the detected duration by a general playback operation.

To further achieve at least the above objects, in whole or in part, and in accordance with the purposes of the invention, as embodied and broadly described herein, there is provided an apparatus for controlling a recording operation of a digital video device in accordance with an embodiment of the invention that includes a microcomputer configured to detect duration of a portion of a data stream, reproduction of which is to be restricted by a restriction operation, from a sequentially received data stream while recording the sequentially received data stream and to generate and record navigation information for selectively reproducing the remaining duration of the data stream other than the detected duration by a general playback operation.

To further to achieve at least the above objects, in whole or in part, and in accordance with the purposes of the invention, as embodied and broadly described herein, there is provided a method for controlling a recording operation of a digital video device in accordance with an embodiment of the invention that includes detecting duration of a portion of a data stream, reproduction of which is to be restricted by a restriction operation, while reproducing the data stream and transmitting the reproduced data stream to an external device, and skipping reproduction of the portion of the data stream by controlling the external device to pause a data recording operation at the portion of the data stream and restart reproduction of the data stream at the remaining portion of the data stream.

To further to achieve at least the above objects, in whole or in part, and in accordance with the purposes of the invention, as embodied and broadly described herein, there is provided a method for controlling a recording operation of a digital video device in accordance with an embodiment of the invention that includes detecting duration of a portion of a data stream, reproduction of which is to be restricted by a restriction operation, while reproducing a data stream and transmitting the reproduced data stream to an external device such that the external device can record data therein, and generating navigation information capable of selectively reproducing the remaining portion of the data stream other than the detected duration by a general playback operation, and transmitting the generated navigation information to the external device.

To further achieve at least the above objects, in whole or in part, and in accordance with the purposes of the invention, as embodied and broadly described herein, there is provided an apparatus for controlling a recording operation of a digital video device in accordance with an embodiment of the invention that includes a microcomputer configured to detect duration of a portion of a data stream, reproduction of which is to be restricted by a restriction operation, while reproducing a data stream and transmitting the reproduced data stream to an external device such that the external device can record data therein, and to generate navigation information capable of selectively reproducing the remaining portion of the data stream other than the detected duration by a general playback operation, and transmit the generated navigation information to the external device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
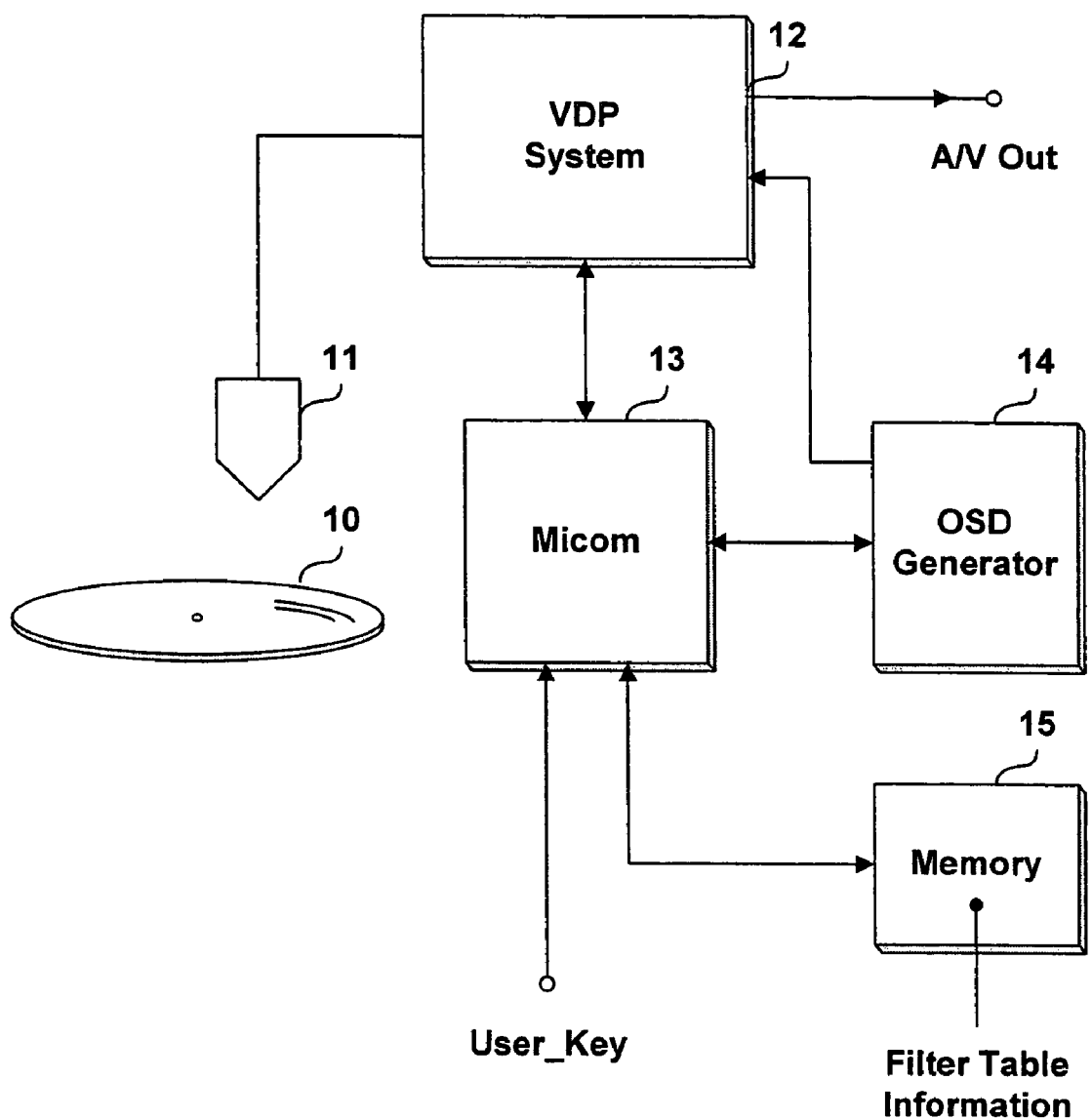
FIG. 1 is a block diagram of a related art DVD player.

Now, a method and apparatus for reproducing replacement data recorded on a disc according to embodiments of the invention will be described with reference to the drawings, in which like reference numerals have been used to designate like elements. It should be noted that embodiments of the invention are applicable to a variety of digital video devices, for example, optical disc devices, such as a DVD-recorder, and a Hard Disc Drive (HDD)—recorder.

Figure 2:
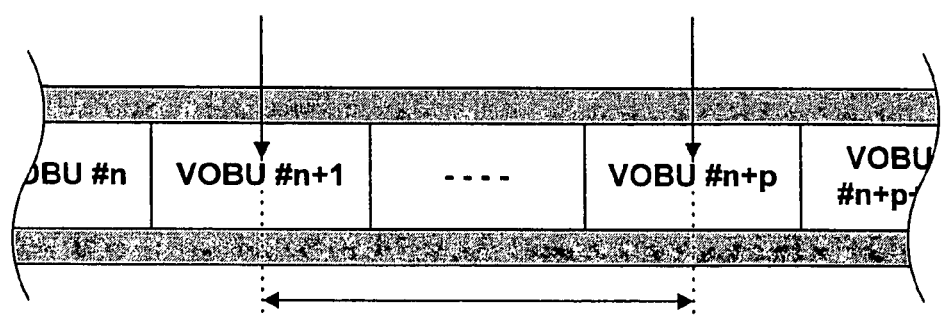
FIG. 2 is a diagram illustrating a filter table needed to perform a related art clearplay operation.
Figure 3:
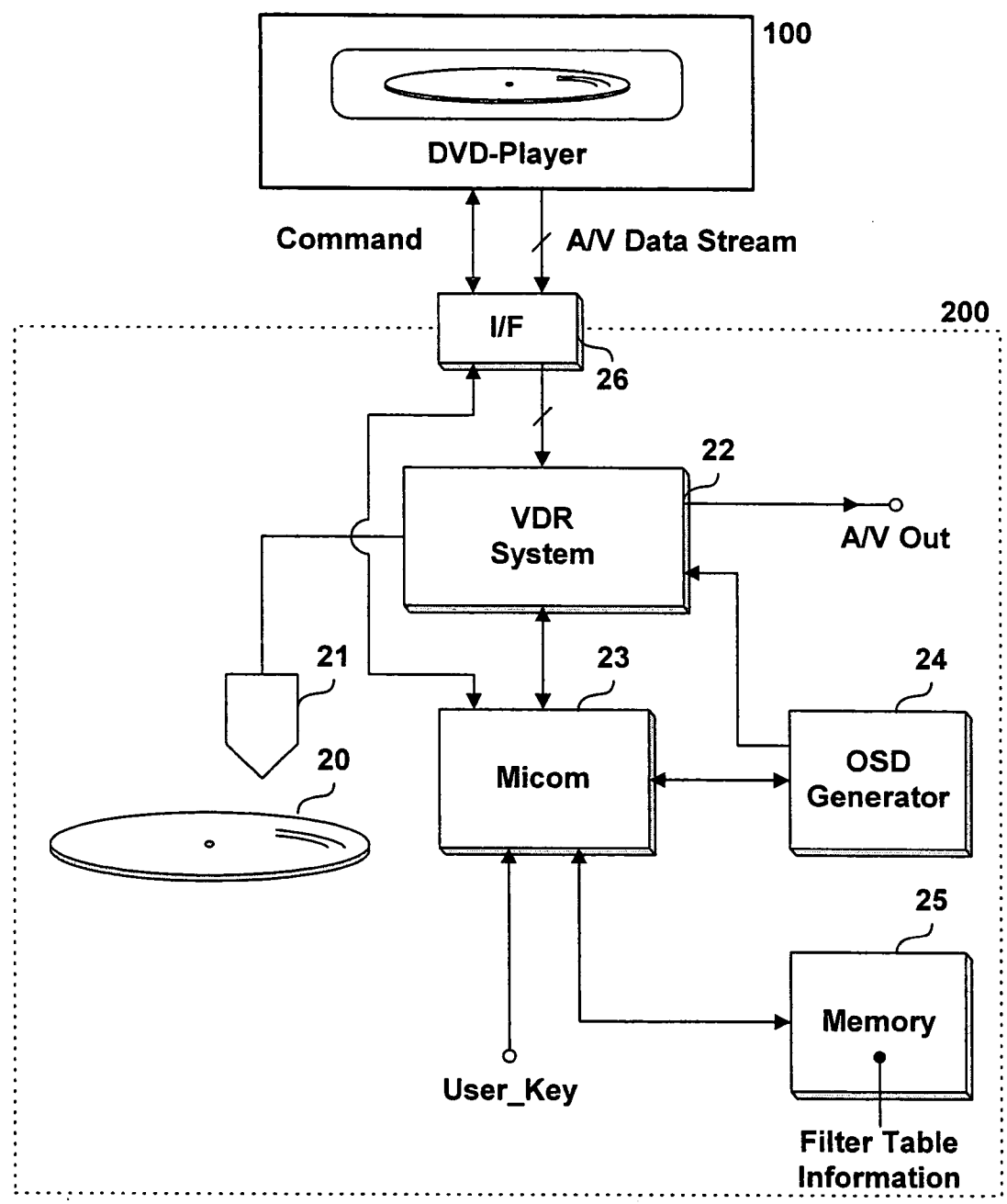
FIG. 3 is a block diagram of a DVD recorder in accordance with an embodiment of the invention.

Referring to FIG. 3, a DVD recorder 200 in accordance with an embodiment of the invention includes an optical disc 20, an optical pickup unit 21, a VDR (Video Disc Recorder) system 22, a microcomputer 23, an OSD generator 24, a memory 25, and an interface unit 26. The memory 25 may download and store filter table information similar to that shown in FIG. 2. The interface unit 26 may be connected to a digital video device 100, such as a DVD player.

The microcomputer 23 may transmit or receive a command to/from the DVD player 100 via the interface unit 26. The VDR system 22 may record an A/V data stream received from the DVD player 100 via the interface unit 26 on the optical disc 20 upon receiving a control signal from the microcomputer 23.

Figure 4:
FIG. 4 is a diagram illustrating OSD images displayed on a screen in accordance with an embodiment of the invention.

The OSD generator 24 may generate a variety of OSD menu images according to a control signal of the microcomputer 23, and display the generated OSD menu images on a screen. For example, a "Clearplay Setting Mode" menu image, as shown in FIG. 4, may include a plurality of menu items for selecting or entering a filter condition restriction operation which will skip over or mute a portion of the data stream as requested by a user.

According to embodiments of the invention, the "Clearplay Setting Mode" menu image may include a specific menu item (for example, "Filter Rec") capable of performing a filter record function. If a user selects the menu item, the OSD generator 24 displays a "Filter Record Setting Mode" menu image. As shown in FIG. 4, the "Filter Record Setting Mode" menu image may include a user-defined filter condition (for example, Violence and Sex) and a field for entering a user-desired title name.

For example, if the filter conditions are determined to be "Violence" and "Sex" and the title name "Super Girl" is entered and set, the microcomputer 23 refers to the title name "Super Girl" and the filter conditions during a data recording process, such as a disc copy process, and performs a series of filter record operations so that it prevents some duration consistent with the filter conditions from being recorded, or additionally records navigation information to restrict reproduction of the duration even if the duration has been recorded in a recording process. A detailed description of the above-described operations will hereinafter be described.

Figure 5:
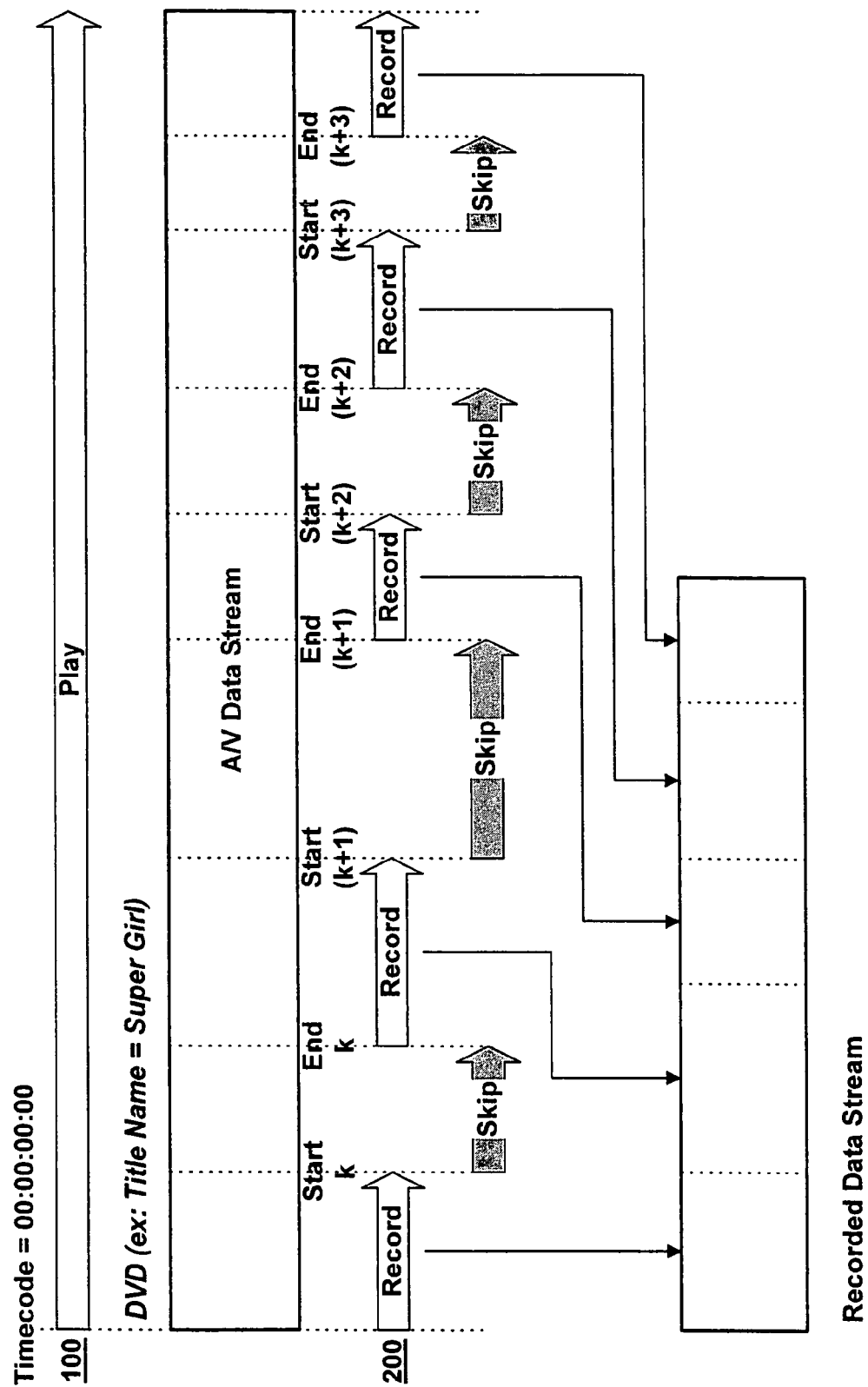
FIG. 5 is a diagram illustrating a method for controlling a recording operation of a digital video device in accordance with an embodiment of the invention.

FIG. 5 is a diagram illustrating a method for controlling a recording operation of a digital video device in accordance with an embodiment of the invention. For example, when the DVD recorder 200 receives an A/V data stream of a title reproduced by the DVD player 100 and records the received A/V data stream, for example, in a DVD-RW disc, the microcomputer 23 simultaneously begins a playback operation and a recording operation by interfacing commands with a microcomputer (not shown) of the DVD player 100, and counts a timecode of "Hour:Minute:Second:Frame" (for example, "hr:mm:sec: fr").

The microcomputer 23 compares the aforementioned counted timecode with filter table information managed by the memory 25. For example, if the title name is determined to be "Super Girl" and the filter conditions are determined to be "Violence" and "Sex", the microcomputer 23 searches for each event corresponding to the tide name and the filter conditions from among the filter table information, and compares start and end timecodes (Start k & End k, Start k+1 & End k+1, . . . ) of the retrieved event with a current counted timecode.

If some duration consistent with a timecode of the retrieved event is detected from the A/V data stream sequentially received from the DVD player 100, the microcomputer 23 controls the VDR system 22 to pause a recording operation. That is, the microcomputer 23 performs a series of filter record operations, which skip over a data recording operation of some duration consistent with a user-defined filter condition, and record data in the remaining duration consistent with the user-defined filter condition.

If the above-described filter record operation is complete, the microcomputer 23 generates playback control information corresponding to the filter record operation, and records the playback control information as navigation information in a Lead-In area of the DVD-RW disc. For example, a data length of the recorded title may be shorter than that of a source title.

Therefore, only the remaining duration other than durations corresponding to the user-defined filter conditions "Violence" and "Sex" is selectively recorded in the DVD-RW disc, as shown in FIG. 5, such that operations for copying contents data inappropriate for adolescents or children can be effectively prevented.

Figure 6:
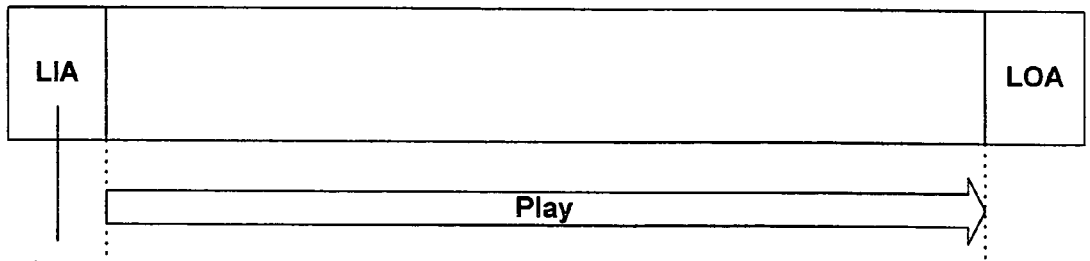
FIG. 6 is a diagram illustrating a method for controlling a recording operation of a digital video device in accordance with another embodiment of the invention.
Figure 6:
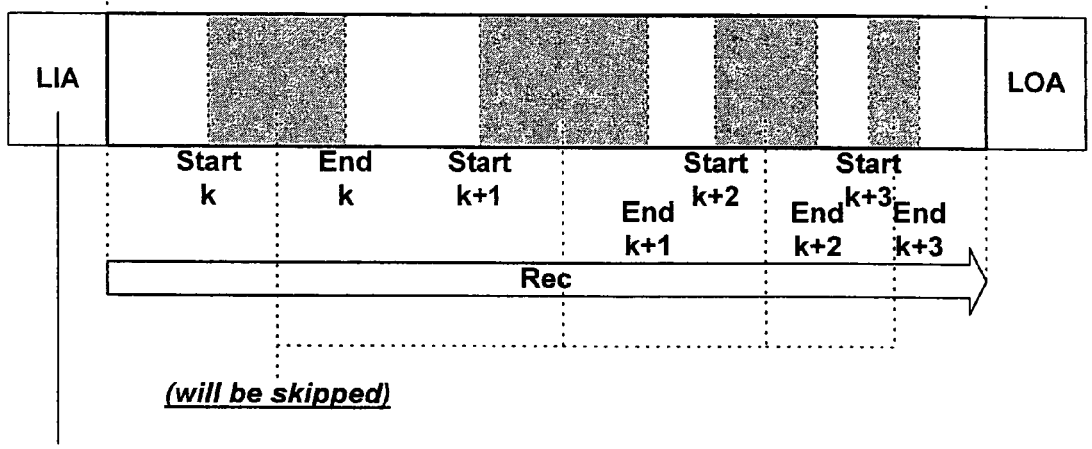

FIG. 6 is a diagram illustrating a method for controlling a recording operation of a digital video device in accordance with another embodiment of the invention. As described above, when the DVD recorder 200 receives an A/V data stream of a tide reproduced by the DVD player 100 and records the received A/V data stream in, for example, a DVD-RW disc, the microcomputer 23 simultaneously begins playback and recording operations by interfacing commands with a microcomputer (not shown) of the DVD player 100, and counts a timecode of "Hour:Minute:Second:Frame" (for example, "hr:mm:sec:fr").

The microcomputer 23 compares the aforementioned counted timecode with filter table information managed by the memory 25. For example, if the tide name is determined to be "Super Girl" and the filter conditions are determined to be "Violence" and "Sex", the microcomputer 23 searches for each event corresponding to the title name and the filter conditions from among the filter table information, and compares start and end timecodes (Start k & End k, Start k+1 & End k+1, . . . ) of the retrieved event with a current counted timecode.

If some duration consistent with a timecode of the retrieved event is detected from the A/V data stream when the A/V data stream sequentially received from the DVD player 100 is continuously recorded in the DVD-RW disc, the microcomputer 23 determines the detected duration to be a specific duration to be skipped over during a playback operation, and temporarily stores corresponding position information (for example, physical sector number). If the above-described data record operation is complete, the microcomputer 23 generates playback control information corresponding to the data record operation, and records the playback control information as navigation information in a Lead-In area of the DVD-RW disc.

As shown in FIG. 6, original playlist data, which may be recorded in a Lead-In area of a DVD-ROM, may be managed as navigation information capable of controlling reproduction of the overall A/V data stream (All_A/V Data Stream) of a source title. Meanwhile, another original playlist data, which may be generated by the microcomputer 23 and newly recorded in the Lead-In area of the DVD-RW disc, may be adapted to selectively reproduce the remaining duration other than some duration to be skipped over when performing a playback operation, and may be managed as navigation information capable of controlling reproduction of a partial A/V data stream (Partial_A/V Data Stream) of a recorded title.

The microcomputer 23 may additionally generate user-defined playlist data (UD_Playlist: User Defined Playlist) capable of controlling reproduction of the overall A/V data stream (All_A/V Data Stream), and record the user-defined playlist data separately from the original playlist data. Therefore, in the case of reproducing data of the DVD-RW disc, the microcomputer 23 may automatically skip over some duration consistent with the user-defined filter conditions (for example, "Violence" and "Sex") by referring to the original playlist data newly recorded to control reproduction of partial A/V data stream (Partial A/V Data Stream), such that it prevents video and audio data of some duration inappropriate for adolescents or children from being freely reproduced.

User-defined playlist data (UD_Playlist) for controlling reproduction of the overall A/V data stream (All_A/V Data Stream) may be additionally recorded in, for example, the DVD-RW disc. In this case, the microcomputer 23 identifies a password entered by the user. If the password is determined to be that of a pre-authenticated user (for example, parents), the microcomputer 23 can reproduce the overall A/V data stream of the recorded title by referring to the user-defined playlist data (UD_Playlist) according to a request of the user.

Figure 7:
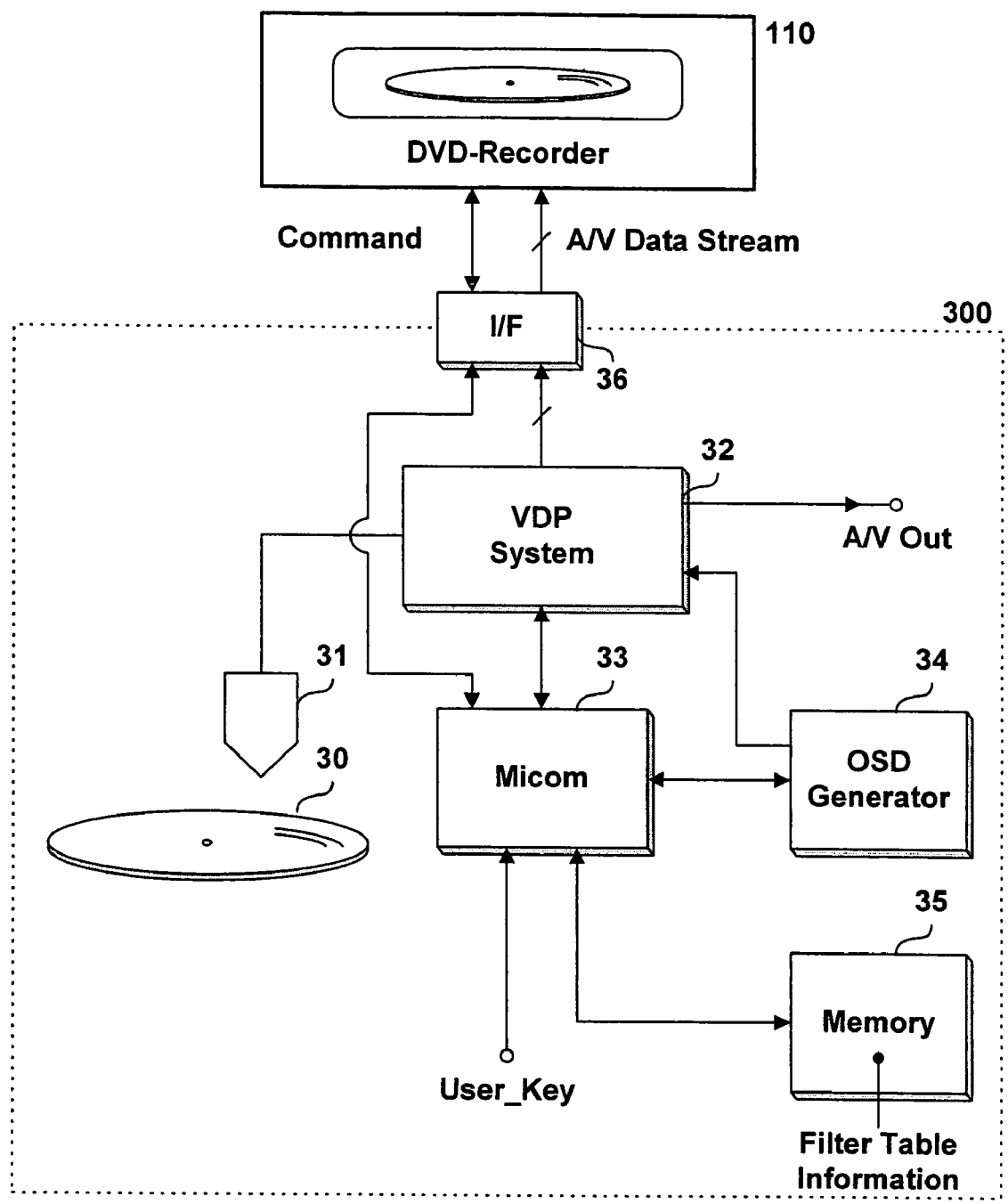
FIG. 7 is a block diagram of a DVD player in accordance with another embodiment of the invention.

It should be noted that embodiments of the invention are applicable to not only a DVD recorder, but also a DVD player. For example, as shown in FIG. 7, the DVD player 300 according to another embodiment of the invention includes an optical disc 30, an optical pickup unit 31, a VDP system 32, a microcomputer 33, an OSD generator 34, a memory 35, and an interface unit 36. The memory 35 may download and store filter table information similar to that shown in FIG. 2. The interface unit 36 may be connected to a digital video device 110, such as a DVD recorder.

The microcomputer 33 may transmit or receive a command to/from the DVD recorder 110 via the interface unit 36. The VDP system 32 may read an A/V data stream from the optical disc 30, and transmit the read A/V data stream to the DVD recorder 110 via the interface unit 36.

Figure 8:
FIG. 8 is a diagram illustrating OSD images displayed on a screen in accordance with another embodiment of the invention.

The OSD generator 34 may generate a variety of OSD menu images according to a control signal of the microcomputer 33, and display the generated OSD menu images on a screen. For example, a "Clearplay Setting Mode" menu image, as shown in FIG. 8, may include a plurality of menu items for selecting or entering a filter condition which will be skipped over or muted by a user.

According to this embodiment of the invention, the "Clearplay Setting Mode" menu image may include a specific menu item (for example, "Filter Trans") capable of performing a filter transmission function (for example, "Filter Transmission") newly defined by embodiments of the invention. If a user selects the menu item, the OSD generator 34 displays a "Filter Transmission Setting Mode" menu image. As shown in FIG. 8, the "Filter Transmission Setting Mode" menu image includes a user-defined filter condition (for example, Violence, and Sex) and a field for entering a user-desired title name.

For example, if the filter conditions are determined to be "Violence" and "Sex" and the title name "Super Girl" is entered and set, the microcomputer 33 refers to the title name "Super Girl" and the filter conditions during a data playback operation for a disc copy operation, and performs a series of necessary operations, so that it prevents some duration consistent with the filter conditions from being reproduced and transmitted, or generates navigation information to restrict reproduction of some duration even if the duration has been produced, transmitted, and recorded, and additionally transmits the navigation information. A detailed description of the above-described operations will hereinafter be described.

Figure 9:
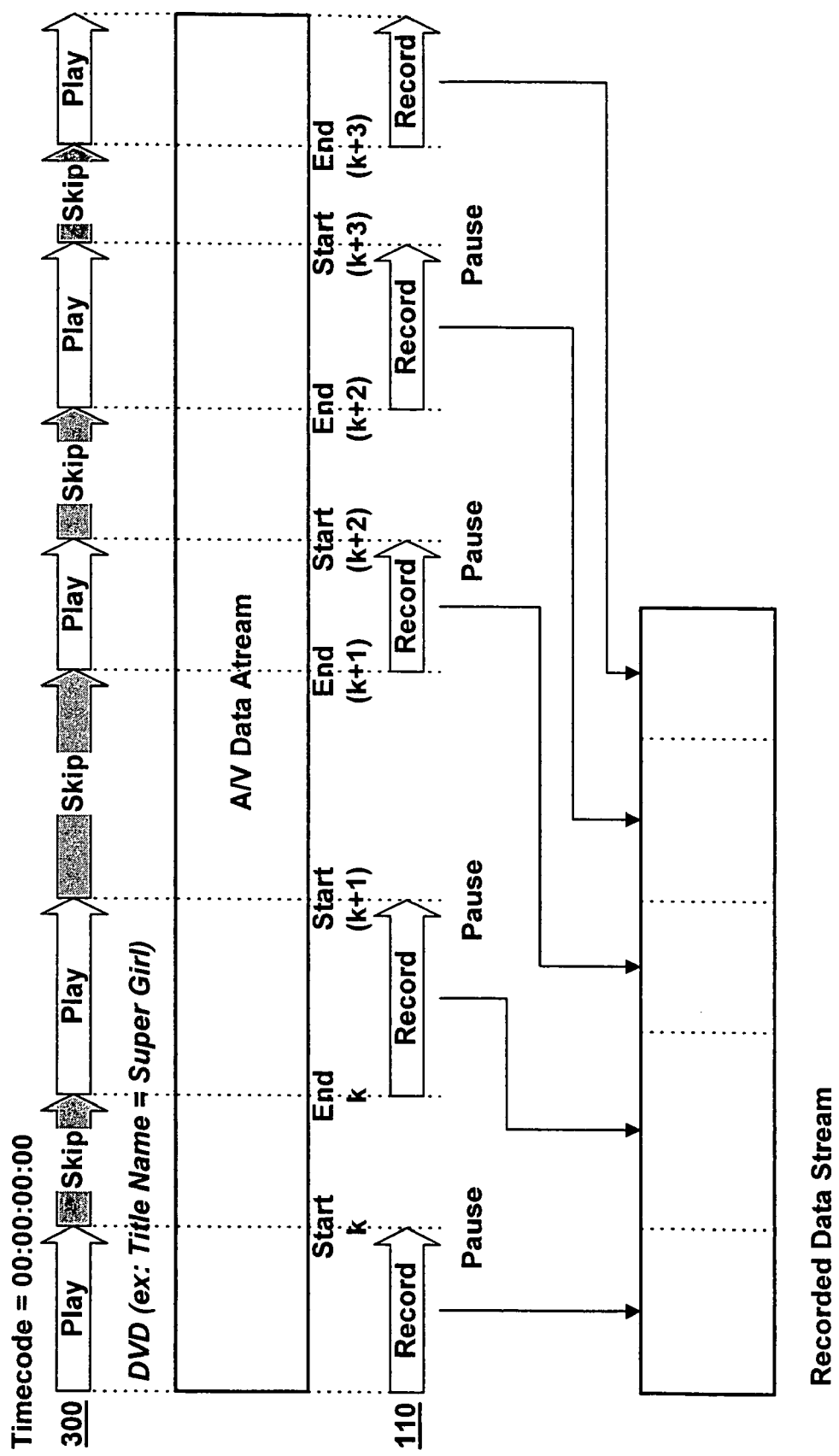
FIG. 9 is a diagram illustrating a method for controlling a recording operation of a digital video device in accordance with another embodiment of the invention.

FIG. 9 is a diagram illustrating a method for controlling a recording operation of a digital video device in accordance with another embodiment of the invention. For example, when an A/V data stream of a tide read from the optical disc 30 loaded in the DVD player 300 is transmitted to the DVD recorder 110 and is recorded in, for example, a DVD-RW disc, the microcomputer 33 simultaneously begins playback and recording operations by interfacing commands with a microcomputer (not shown) of the DVD recorder 110, and counts a timecode of "Hour:Minute:Second:Frame" (for example, "hr:mm:sec:fr").

The microcomputer 33 compares the aforementioned counted timecode with filter table information managed by the memory 35. For example, if the title name is determined to be "Super Girl" and the filter conditions are determined to be "Violence" and "Sex", the microcomputer 33 searches for each event corresponding to the tide name and the filter conditions from among the filter table information, and compares start and end timecodes (Start k & End k, Start k+1 & End k+1, . . . ) of the retrieved event with a current counted timecode.

If some duration consistent with a timecode of the retrieved event is detected from the A/V data stream read from the optical disc 30, such as a DVD-ROM, the microcomputer 33 controls the VDP system 32, such that it automatically skips over the duration, and controls the DVD recorder 110 to pause a data recording operation in the duration by interfacing commands with the DVD recorder 110. If the above-described operations are complete, the microcomputer 33 generates playback control information corresponding to the operations, and transmits the playback control information to the DVD recorder 110.

The DVD recorder 110 records the received playback control information as navigation information in a Lead-In area of the DVD-RW disc. For example, a data length of the recorded tide may be shorter than that of a source title. Therefore, only the remaining duration other than the durations corresponding to the user-defined filter conditions "Violence" and "Sex" is selectively recorded in the DVD-RW disc, as shown in FIG. 9, such that operations for copying contents data inappropriate for adolescents or children can be effectively prevented.

Figure 10:
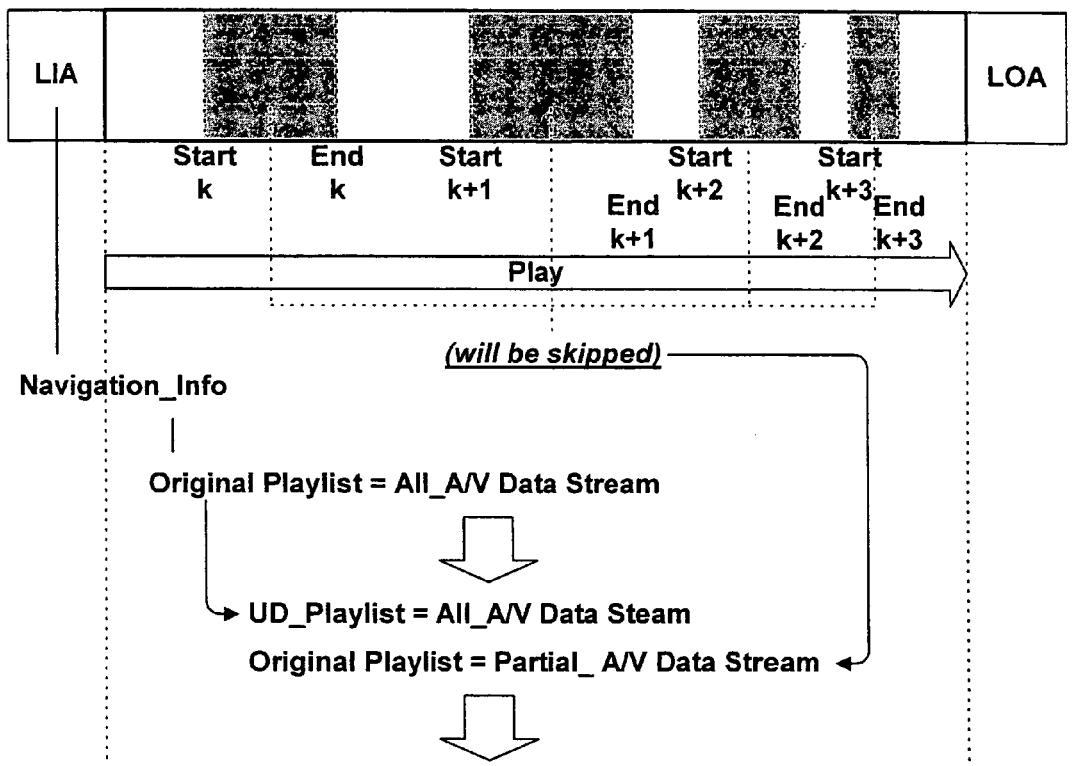
FIG. 10 is a diagram illustrating a method for controlling a recording operation of a digital video device in accordance with another embodiment of the invention.
Figure 10:
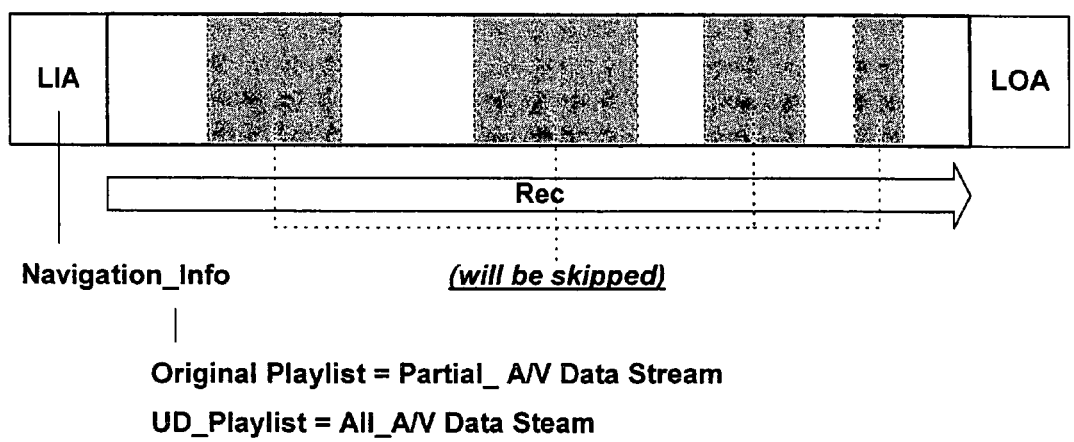

FIG. 10 is a diagram illustrating a method for controlling a recording operation of a digital video device in accordance with another embodiment of the invention. As described above, when an A/V data stream of a title read from the optical disc 30 of the DVD player 300 is transmitted to the DVD recorder 110 and is recorded in, for example, a DVD-RW disc, the microcomputer 33 simultaneously begins playback and recording operations by interfacing commands with a microcomputer (not shown) of the DVD recorder 110, and counts a timecode of "Hour:Minute:Second:Frame" (for example, "hr:mm:sec:fr").

The microcomputer 33 compares the aforementioned counted timecode with filter table information managed by the memory 35. For example, if the title name is determined to be "Super Girl" and the filter conditions are determined to be "Violence" and "Sex", the microcomputer 33 searches for each event corresponding to the title name and the filter conditions from among the filter table information, and compares start and end timecodes (Start k & End k, Start k+1 & End k+1, . . . ) of the retrieved event with a current counted timecode. If some duration consistent with a timecode of the retrieved event is detected from an A/V data stream read from the optical disc 30, such as a DVD-ROM, on the condition that the A/V data stream is sequentially transmitted to the DVD recorder 110 and at the same time is continuously recorded in the DVD-RW disc, the microcomputer 33 determines that the duration is a specific duration to be skipped over during a playback operation, and temporarily stores corresponding position information (for example, a physical sector number). If the above-described data recording operation is complete, the microcomputer 33 generates playback control information corresponding to the data recording operation, and transmits the playback control information to the DVD recorder 110.

As shown in FIG. 10, the microcomputer 33 changes original playlist data managed by the Lead-In area of the DVD-ROM to user-defined playlist data (UD_Playlist), and transmits the resultant data to the DVD recorder 110. Also, the microcomputer 33 generates playback control information, which can selectively reproduce data of the remaining duration other than some duration to be skipped over during a playback operation from among the A/V data stream recorded in the DVD-RW disc, as new original playlist information, and transmits the playback control information to the DVD recorder 110.

The DVD recorder 110 records the aforementioned original playlist data and the user-defined playlist data in different sections of the Lead-In area of the DVD-RW disc. Therefore, in the case of reproducing data of the DVD-RW disc, the microcomputer 33 automatically skips over some duration consistent with the user-defined filter conditions (for example, "Violence" and "Sex") by referring to original playlist data newly recorded to control reproduction of the partial A/V data stream (Partial_A/V Data Stream), such that it prevents video and audio data of some duration inappropriate for adolescents or children from being freely reproduced.

User-defined playlist data (UD-Playlist) for controlling reproduction of the overall A/V data stream (All_A/V Data Stream) may be additionally recorded in the DVD-RW disc. In this case, the microcomputer 33 identifies a password entered by the user. If the password is determined to be that of a pre-authenticated user (for example, parents), the microcomputer 33 can reproduce the overall A/V data stream of the recorded title by referring to the user-defined playlist data (UD_Playlist) according to a request of the user.

It should be noted that embodiments of the invention are applicable, for example, to a DVD recorder, a DVD player, and a variety of other digital video devices, and are also applicable to a technical field for recording a received digital broadcast data stream on an optical disc or an HDD. Also, some terms (for example, clearplay, filter condition, filter table, filter record, filter transmission, original playlist, and user-defined playlist) can be replaced with other similar terms if necessary.

The method and apparatus for controlling a recording operation on a digital video device according to embodiments of the invention provide at least the below mentioned advantages.

The method and apparatus for controlling a recording operation on a digital video device according to embodiments of the invention prevent a data stream of some duration consistent with a user-defined filter condition from being recorded in a data recording process, such as a disc copy process. For example, the method and apparatus for controlling a recording operation on a digital video device according to embodiments of the invention prevent some duration of a title consistent with a playback restriction condition determined by a user from being recorded, or restricts reproduction of some duration of a title even if the duration has been recorded.

Additionally, the method and apparatus for controlling a recording operation on a digital video device according to embodiments of the invention restrict reproduction of some duration consistent with a user-defined filter condition, even if the duration has been recorded in a data recording process, such as a disc copy process. Also, the method and apparatus for controlling a recording operation on a digital video device according to embodiments of the invention prevent video and audio data of some duration inappropriate for adolescents or children from being freely recorded during a data recording process, such as a disc copy process. Although video and audio data of some duration inappropriate for adolescents or children is unavoidably recorded during a data recording process, such as a disc copy process, embodiments of the invention can prevent the video and audio data from being reproduced.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a recording operation of a digital video device, comprising:
   accessing a filter table stored in the digital video device, the filter table including one or more user-selected content restrictions relating to at least one of sex, violence, or gruesome content;
   detecting start and end time codes that correspond to a portion of a data stream, reproduction of which is to be restricted by a restriction operation, the start and end time codes of said portion of the data stream corresponding to the one or more user-selected content restrictions set in the filter table;
   generating navigation information for selectively controlling playback of the data stream without said portion corresponding to the one or more user-selected content restrictions, the navigation information generated based on the detected start and end time codes;
   recording at least a portion of the data stream and the navigation information on a disk or other medium, said recording including changing original playlist data on the disk or other medium based on the navigation information for selectively controlling playback of the data stream without said portion corresponding to the one or more user-selected content restrictions;
   generating user-defined playlist data to control reproduction of the data stream overall including said portion corresponding to the one or more user-selected content restrictions, and
   recording the user-defined playlist data separately from the original playlist data as navigation information in a lead-in area of the disk, wherein playback of the data stream without said portion corresponding to the one or more user-selected content restrictions is controlled based on the user-defined playlist recorded as navigation information in the lead-in area of the disk.

2. The method according to claim 1, wherein said detecting includes: detecting a specific duration corresponding to the start and end time codes, said portion to be automatically skipped over or muted by the restriction operation during the general playback operation by referring to the changed original playlist data based on the navigation information recorded on the disk or other medium.

3. The method according to claim 1, further comprising:
   recording a partial data stream corresponding to the user-defined playlist data separately from all of the data stream corresponding to the original playlist on the disk or another medium.

4. Apparatus for controlling a recording operation of a digital video device, comprising:
   a microcomputer configured to:
   access a filter table stored in the digital video device, the filter table including one or more user-selected content restrictions relating to at least one of sex, violence, or gruesome content;
   detect start and end time codes that correspond to a portion of a data stream, reproduction of which is to be restricted by a restriction operation, the start and end time codes corresponding to the one or more user-selected content restrictions set in the filter table;
   generate navigation information for selectively controlling playback of the data stream without said portion corresponding to the one or more user-selected content restrictions, the navigation information generated based on the detected start and end time codes;
   record at least a portion of the data stream and the navigation information on a disk or other medium, wherein the microcomputer changes original playlist data on the disk or other medium based on the navigation information for selectively controlling playback of the data stream without said portion corresponding to the one or more user-selected content restrictions;
   generate user-defined playlist data to control reproduction of the data stream overall including said portion corresponding to the one or more user-selected content restrictions, and
   record the user-defined playlist data separately from the original playlist data as navigation information in a lead-in area of the disk, wherein playback of the data stream without said portion corresponding to the one or more user-selected content restrictions is controlled based on the user-defined playlist recorded as navigation information in the lead-in area of the disk.

5. The apparatus according to claim 4, wherein the microcomputer is further configured to detect a specific duration corresponding to the start and end time codes, said portion to be automatically skipped over or muted during playback by referring to the changed original playlist data based on navigation information stored in the disk or other medium.

6. A DVD player comprising the apparatus of claim 4.

7. The apparatus according to claim 4, wherein the microcomputer is configured to record a partial data stream corresponding to the user-defined playlist data separately from all of the data stream corresponding to the original playlist on the disk or another medium.

* * * * *